United States Patent
Padula et al.

(10) Patent No.: US 11,423,210 B2
(45) Date of Patent: Aug. 23, 2022

(54) SYSTEM AND METHOD FOR DYNAMICALLY DEFINING DIGITAL FORMS

(71) Applicants: Richard W. Padula, Barrington, IL (US); Robert J. Padula, Lake Zurich, IL (US); Randall Fredrick, Steamboat Springs, CO (US); Ronald Erickson, Sleepy Hollow, IL (US)

(72) Inventors: Richard W. Padula, Barrington, IL (US); Robert J. Padula, Lake Zurich, IL (US); Randall Fredrick, Steamboat Springs, CO (US); Ronald Erickson, Sleepy Hollow, IL (US)

(73) Assignee: Mirata Software, LLC, Chicago, IL (US)

( * ) Notice: Subject to any disclaimer, the term of this patent is extended or adjusted under 35 U.S.C. 154(b) by 0 days.

(21) Appl. No.: 17/241,633

(22) Filed: Apr. 27, 2021

(65) Prior Publication Data

US 2021/0334453 A1    Oct. 28, 2021

Related U.S. Application Data

(60) Provisional application No. 63/016,587, filed on Apr. 28, 2020.

(51) Int. Cl.
*G06F 17/00* (2019.01)
*G06F 40/157* (2020.01)
(Continued)

(52) U.S. Cl.
CPC .......... *G06F 40/157* (2020.01); *G06F 40/174* (2020.01); *G06F 40/226* (2020.01); *G06N 20/00* (2019.01)

(58) Field of Classification Search
CPC .... G06F 40/157; G06F 40/174; G06F 40/226; G06N 20/00
See application file for complete search history.

(56) References Cited

U.S. PATENT DOCUMENTS

| 7,774,504 B2 | 8/2010 | Chene et al. |
| 9,471,611 B2 | 10/2016 | Leonard et al. |
| (Continued) | | |

OTHER PUBLICATIONS

Li, Deqing, et al. "ECharts: a declarative framework for rapid construction of web-based visualization." Visual Informatics 2.2 (2018): 136-146 (Year: 2018).*

(Continued)

*Primary Examiner* — Andrew T McIntosh
(74) *Attorney, Agent, or Firm* — Sheppard, Mullin, Richter & Hampton LLP

(57) ABSTRACT

A system and method for dynamically generating, defining and customizing forms and workflows based on a user's input and design, and to facilitate content management through real-time artificial intelligence and machine learning processing across a variety of field-force industries and the like. The system and method can be used on a wide variety of physical devices, including web browsers, mobile devices, smartphones and tablets, and can be embedded in software applications. An example system and method allows for the designing, routing, filling out, and recording of forms to update back-end systems, and dramatically expands the number of users who can design complex, enterprise-grade forms and workflows for complex processes, thus lowering costs and accelerating adoption.

25 Claims, 18 Drawing Sheets

(51) Int. Cl.
    *G06N 20/00*        (2019.01)
    *G06F 40/226*       (2020.01)
    *G06F 40/174*       (2020.01)

(56)                References Cited

U.S. PATENT DOCUMENTS

| | | | |
|---|---|---|---|
| 9,652,510 | B1* | 5/2017 | Huang ............ G06N 20/00 |
| 9,836,446 | B2 | 12/2017 | Brisebois et al. |
| 10,198,404 | B2 | 2/2019 | Ekanayake et al. |
| 10,394,948 | B2 | 8/2019 | Brisebois et al. |
| 10,585,982 | B2 | 3/2020 | Brisebois et al. |
| 2008/0148146 | A1* | 6/2008 | Estrada ............ G06F 21/6218 |
| | | | 715/255 |
| 2016/0188302 | A1 | 6/2016 | Fredrick et al. |
| 2016/0232492 | A1* | 8/2016 | Nalsky ............ G06Q 10/103 |
| 2017/0124057 | A1* | 5/2017 | Canton ............ G06F 40/106 |
| 2017/0315979 | A1* | 11/2017 | Boucher ............ G06F 40/197 |
| 2018/0239497 | A1* | 8/2018 | Hiremath ............ G06F 9/451 |
| 2020/0326916 | A1* | 10/2020 | Sreenivasan ............ G06F 40/154 |
| 2021/0042297 | A1* | 2/2021 | Urbanke ............ G06F 16/24542 |

OTHER PUBLICATIONS

Hemel, Zef, and Eelco Visser. "Declaratively programming the mobile web with mobl." Proceedings of the 2011 ACM international conference on Object oriented programming systems languages and applications. 2011 (Year: 2011).*

King, Rob. "Pixaxe: A Declarative,{Client-Focused} Web Application Framework." USENIX Conference on Web Application Development (WebApps 10). 2010 (Year: 2010).*

* cited by examiner

FIG. 10A

Charge Number: _____

CONSTRUCTION DIVISION WATER LEAK REPORT

ADDRESS: _____
LEAK REPORTED BY: Date: _____  Time: 23:00
    ☒ Public
    ☐ Address, Name: _____

| | | Date | Time |
|---|---|---|---|
| FIRST VISITED BY: | | 8-10-18 | 23:50 |
| LEAK STOPPED BY: | | 8-11-18 | 4:15 a.m |
| LEAK REPAIRED BY: | | 8-11-18 | 4:15 a.m |
| MAIN SHUT DOWN BY: | | 8-11-18 | 01:37 |
| SERVICE REPORTED BY: | | 8-11-18 | 4:30 a.m |

VALVES OPERATED (NUMBER & LOCATION): _____

NUMBER OF BLOCKS AFFECTED: __3__  NUMBER OF CUSTOMERS WITHOUT SERVICE: __31__
WERE CUSTOMERS NOTIFIED: ☐ Yes ☒ No  NUMBER OF HYDRANTS OUT OF SERVICE: __2__

RECEIVED AUG 31'18 ENGINEERING

MAIN LEAK DATA

SIZE: ☐4 ☒6 ☐8 ☐10 ☐12 ☐14 ☐16 ☐18 ☐20 ☐24 ☐36 ☐42 ☐48 ☐54 ☐60 ☐Other _____
DEPTH OF MAIN: __6'__ FT  JOINT: ☐FJ ☐MJ ☐MJ(restrained) ☒Load ☐Manufactured Restrained
    ☐Weir ☐Cplg. ☐Flg ☒Unknown ☐Other _____
MATERIAL: ☐Asbestos Cement ☐Cast Iron lining ☒Yes ☒No ☐Unknown ☐Ductile Iron-wrapped
    ☐Ductile Iron-no wrap ☐Concrete ☐Plastic ☐steel ☐Other _____
MAIN LOCATION: __1__ FT. __6__ IN. __A__ OF __A__ ☐Curb Line ☐Prop. Line ☐Bldg. Line OF _____
LEAK LOCATION: __5__ FT. __6__ IN. __E__ OF __W__ ☐Curb Line ☐Prop. Line ☒Bldg. Line OF _____
LEAK TYPE: ☐Transverse ☒Longitudinal ☐Joint ☐Help ☐Other _____
LEAK AT: ☒Plan ☐Filling ☐Valve ☐Joint ☐Corporation ☐Weld ☐Coupling ☐Fusion ☐Other _____
LEAK CAUSED BY: ☒Corrosion ☐Natural Force ☐Hits ☐Pipeline Equip. & Operation ☐C.I. Joint Leak
    ☐Material & Welds ☐Other Outside force ☐Other _____
REPAIR METHOD: ☐Repair Sleeves ☐Tightened Fastener ☐Abandoned ☐Clamped ☐Welded ☐Replaced Coupling
    ☐Replaced Corporation ☐Replaced Filling ☐Replaced Valve ☒Coupled in New Pipe
    ☐Replaced Gasket ☐Other. Explain In Remarks
EXTERIOR CONDITION OF MAIN: ☐Good ☐Fair ☒Poor  INTERIOR CONDITION OF MAIN: ☐Good ☐Fair ☒Poor ☐Net Exposed
HAD PIPE SETTLED OR MOVED? ☐Yes ☒No
WAS THERE PROPERTY DAMAGE?
    ☒ Yes, Explain __parking__
    ☐ No
WAS THERE PAVING DAMAGE?
    ☒ Yes, Explain __Street Cut of sidewalk__
    ☐ No
WERE ANY UNDERGROUND STRUCTURES ADJACENT TO LEAK?
    ☐ Yes, Explain _____
    ☒ No
REMARKS: __Installed 5'6" piece of 6" DI pipe using 2.6" Dresser clips__

DATE OF REPORT: __8-11-18__  FOREMAN: _____  LEAK REPORT NUMBER: _____

REPORT TO
DRAFTING: _____ (Confirm main size and material above) DATE LAID: _____ FORMAN PGJ JOB #: _____
CORROSION SECTION: _____ COMMENTS: _____
DESIGN ENGINEERING: _____ COMMENTS: _____

Construction Division Water Leak Report

Address: _____

Leak Reported By: ☐ Public  ☐ Internal     Reported Date: April 24th 09:23 a.m.

First Visited By: _____     Date: _____     Time: _____

Leak Stopped By: _____     Date: _____     Time: _____

Leak Repaired By: _____     Date: _____     Time: _____

Main shutdown By: _____     Date: _____     Time: _____

Service Restored By: _____     Date: _____     Time: _____

Valves Operated (Number & Location): _____

Number of Customers Notified: _____     Number of Customers without Service: _____

Were Customers Notified: ○ Yes  ○ No     Number of Hydrants Out of Service: _____

Main Leak Data

Size: ☐ 4  ☐ 6  ☐ 8  ☐ 10  ☐ 12  ☐ 14  ☐ 16  ☐ 18  ☐ 20  ☐ 24  ☐ 36     (START)

FIG. 11A

Main Leak Data

Size: ☐ 4  ☐ 6  ☐ 8  ☐ 10  ☐ 12  ☐ 14  ☐ 16  ☐ 18  ☐ 20  ☐ 24  ☐ 36
☐ 42  ☐ 48  ☐ 54  ☐ 60  ☐ Other Depth of Main (ft): _____   Joint: ☐ PJ  ☐ MJ  ☐ MJ(restrained)  ☐ Lead
☐ Manufactured Restrained  ☐ Weld  ☐ Cplg  ☐ Flg
☐ Unknown  ☐ Other Material: ☐ Asbestos Cement  ☐ Cast Iron lining  ☐ Cast Iron no lining  ☐ Unknown   Other _____
☐ Ductile Iron-wrapped  ☐ Ductile Iron-no wrap  ☐ Concrete  ☐ Plastic
☐ Steel  ☑ Other Main Location FT: __0__   IN: __0__   _____ ▾ OF _____ ▾   ☐ Curb Line
☐ Prop Line
☐ Bldg Line

OF: _____

Leak Type: ☐ Transverse  ☐ Longitudinal  ☐ Joint  ☐ Hole  ☐ Other

Leak At: ☐ Pipe  ☐ Fitting  ☐ Valve  ☐ Joint  ☐ Corporation  ☐ Weld   (START)

FIG. 11B

Leak Caused By: ☐ Corrosion ☐ Natural Force ☐ Hits ☐ Pipeline Equip & Operation
☐ CI Joint Leak ☐ Material & Welds ☐ Other Outside Force ☐ Other Repair Method: ☐ Repair Sleeve ☐ Tightened Fastener ☐ Abandoned ☐ Clamped
☐ Welded ☐ Replaced Coupling ☐ Replaced Corporation
☐ Replaced Fitting ☐ Replaced Valve ☐ Coupled in New Pipe
☐ Replaced Gasket ☐ Other Exterior Condition of Main
☐ Good ☐ Fair ☐ Poor Interior Condition of Main
☐ Good ☐ Fair ☐ Poor ☐ Not Exposed Had Pipe Settled or Moved?
☐ Yes ☐ No Was there Property Damage?
☐ Yes ☐ No Was there Paving Damage?
☐ Yes ☐ No Any Underground Structures Adjacent to Leak?
☐ Yes ☐ No Remarks:

(START)

FIG. 11C

| Foreman Approval | | | |
|---|---|---|---|
| Status | Name | Signature | Date |
| ☐ Approved | Virginia Demo | [PRESS TO SIGN] | |
| Comments | | | |

| Drafting Approval | | | |
|---|---|---|---|
| Status | Name | Signature | Date |
| ☐ Approved | | [PRESS TO SIGN] | |
| Comments | | | |

| Corrosion Section Review | | | |
|---|---|---|---|
| Status | Name | Signature | Date |
| ☐ Approved | | [PRESS TO SIGN] | |
| Comments | | | |

| Design Engineering Review | | | |
|---|---|---|---|
| Status | Name | Signature | Date |
| ☐ Approved | | [PRESS TO SIGN] | |
| Comments | | | |

(START)

FIG. 11E

SYSTEM AND METHOD FOR DYNAMICALLY DEFINING DIGITAL FORMS

This patent application claims the benefit of U.S. Provisional Ser. No. 63/016,587 filed Apr. 28, 2020 which is incorporated by reference herein.

FIELD OF THE INVENTION

The field of the invention relates generally to methods and systems of dynamically defining and generating forms and workflows based on a user's input, to facilitate content management including collecting and inputting data in real-time, processing and analyzing data, assimilating and displaying data on a wide variety of devices including web browsers and mobile devices, and embedding these methods and systems in other software applications. Furthermore, the present invention is directed to systems and methods for managing and assimilating data content through artificial intelligence processing to efficiently achieve various objectives.

BACKGROUND

Today, most data in field force industries (e.g., field sales, field services, inspection and reporting, etc.) is distributed and captured on paper-based forms which are then physically routed among various stakeholders both in offices and fields, with updates to back-end systems being a manual process. There is a significant business benefit to digitizing these forms, automatically electronically routing these forms among the stakeholders, and automatically updating the back-end systems. There have been many attempts to develop such forms, however, current approaches are limited in terms of what can be done before resorting to manual and complex coding. Current approaches are also designed based on the technical features of a browser (e.g., a web browser) rather than the needs of a user. These approaches use a combination of an extensible-mark-up-language, such as hypertext markup language (HTML), and a style sheet language, such as cascading style sheets (CSS), and when complex logics are involved, one must code these complex logics in JavaScript, requiring additional skills and thereby limiting who can create and design forms.

For example, conventional approaches are described in U.S. Pat. Nos. 9,836,446, 10,394,948, and 10,585,982, which describe systems and methods for customizing mobile-form applications for distribution to mobile devices. These references describe utilization of an extensible markup language (XML) schema for use with digital forms that is well-known and conventional in the art, but which is limited and inflexible. In particular, these references describe using XForms—which utilizes XPath for calculations—for the generation of digital forms. Unfortunately, XForms are not designed for use with data forms, and moreover, the data forms disclosed in these references do not feature a specialized calculations engine and have no support for dynamic styling. These conventional approaches also do not provide for fine-tuned control over the layout of a form aside from basic grouping of controls. Instead of relying on a browser to figure out the layout of a form using a combination of HTML and CSS, there is a need for a richer set of features for layout control, including column and row sections, field height and width, margins, and other dynamic features like tabs and collapsible areas. While XForms works with XML-based data, most modern web APIs use JSON because it is more compact, easier to parse, and just as capable at payload delivery. Thus, the XForms design severely limits its adaptability. There is thus a need to work across a variety of formatting, including JSON and XML, and to provide significant flexibility to form designers to permit the creation of dynamic forms as further described herein.

Therefore, it would be desirable to have a system and method for designing, routing, filling out, and recording of digital forms across multiple computing platforms—with an ability to use data of those forms to update back-end systems—that allows forms made by those who are not skilled at coding to nonetheless be able to design forms with sophisticated logic designed specifically to individual needs. It is further desirable to dramatically expand the number of users who can design complex, enterprise-grade digital forms and work-flow for complex processes, thus lowering costs and accelerating adoption.

SUMMARY OF THE INVENTION

In summary, the present invention relates generally to methods and systems of dynamically generating forms and workflows based on a user's input, to facilitate content management including collecting and inputting data in real-time, processing and analyzing data, assimilating and displaying data on a variety of devices including web browsers and mobile devices, and embedding these methods and systems in other software applications. In addition, the present invention is directed to systems and methods for managing and assimilating data content through artificial intelligence processing to efficiently achieve various objectives.

It is a further object of the present invention to provide a method for using a declarative definition language to drive a presentation renderer to render a form. The method includes the steps of defining a form using a declarative definition language, wherein the declarative definition language defines the form in terms of its fields and its presentation, generating a run-time object from the declarative definition language, entering the form data, evaluating a calculation against the form data and returning a result, and rendering the form with a presentation renderer, wherein the presentation renderer uses the run-time object and the form data.

It is yet another object of the present invention to provide a system for using a declarative definition language to drive a presentation renderer to render a form. The system includes a form defined using a declarative definition language, wherein the declarative definition language defines the form in terms of its fields and its presentation, a run-time object generated from the declarative definition language, a form data, a returned result from a calculation evaluated against the form data, and a presentation renderer for rendering the form, wherein the presentation renderer uses the run-time object and the form data.

These and other objects, features, and characteristics of the systems and/or methods disclosed herein, as well as methods of operation and functions of related elements of structure and combination of parts and economies of manufacture, will become more apparent upon consideration of the following description and appended claims with reference to the accompanying drawings, all of which form a part of this specification, wherein reference numerals designate corresponding parts in the drawings. It is to be expressly understood, however, that the drawings are for the purpose of illustration and description only and are not intended to limit the invention to particular embodiments. As used herein, the singular form of "a", "an", and "the" include plural referents unless context clearly dictates otherwise.

BRIEF DESCRIPTION OF THE DRAWINGS

The above and/or other aspects of the invention will be more apparent by describing in detail exemplary embodiments of the invention with reference to the accompanying drawings, in which:

FIG. 10A shows a first page of an exemplary paper form that can be designed and generated into a digital format according to an embodiment of the present invention.

FIG. 11A shows a first example of a digital form generated according to an embodiment of the present invention from the paper form in FIGS. 10A and 10B.

FIG. 11B shows a second example of a digital form generated according to an embodiment of the present invention from the paper form in FIGS. 10A and 10B.

FIG. 11C provides a third example of a digital form generated by the system according to an embodiment of the present invention from the paper form in FIGS. 10A and 10B.

FIG. 11E shows a fifth example of a digital form generated according to an embodiment of the present invention from the paper form in FIGS. 10A and 10B.

DETAILED DESCRIPTION OF THE INVENTION

This present invention relates to systems and methods for dynamically generating and storing forms using a declarative definition language, rendering the forms to a user, allowing the user to interact (e.g., enter data) with the forms, allowing data to be derived or retrieved, and allowing for the data to be stored and analyzed.

It will be appreciated by those having skill in the art that the implementations described herein may be practiced without these specific details or with an equivalent arrangement. In other instances, well-known structures and devices are shown in block diagram form in order to avoid unnecessarily obscuring the implementations of the invention.

Figure 1A:
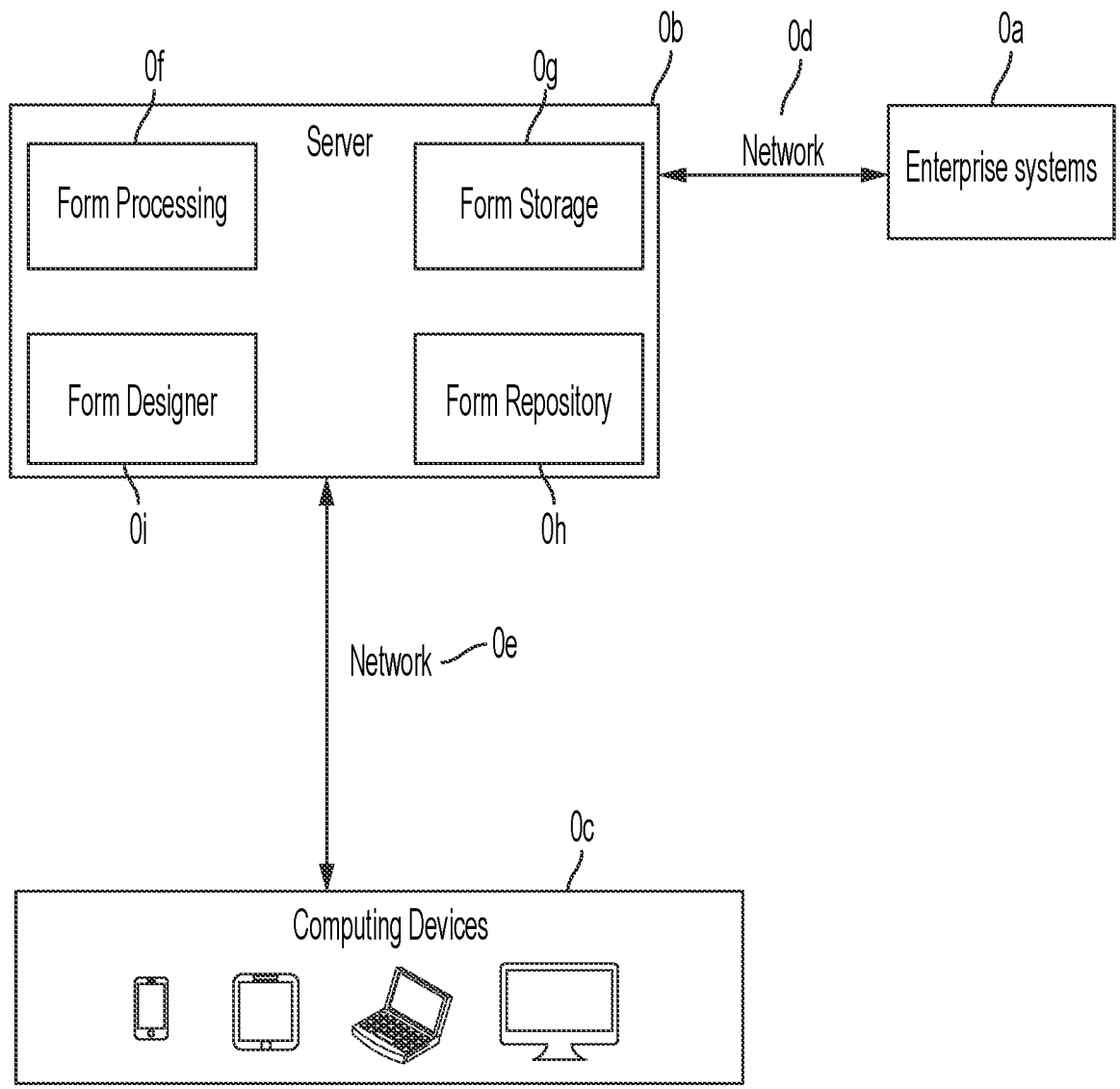
FIG. 1A illustrates a diagram of a system according to an embodiment of the present invention, whereby a computing device can access a digital form on a server through a network.

FIG. 1A illustrates a diagram of a system according to an embodiment of the present invention, whereby a computing device can access a digital form on a server through a network.

According to an embodiment of the present invention, enterprise systems $0a$ are connected via a network $0d$ to a server $0b$. It can be appreciated that this network $0d$ may be any manner of wired or wireless connection known in the art, including over the Internet. Moreover, the server $0b$ is also connected over a network $0e$ to computing devices $0c$ containing an application, software, program, or other processing devices for implementing the system and method of the present invention. In some embodiments, the network $0d$ and the network $0e$ are the same network, and the enterprise systems $0a$ may be a part of or a component within the server $0b$.

The server $0b$ contains four separate components: a form processing module $0f$, a form storage device $0g$, a form designer module $0i$, and a form repository $0h$. The form processing $0f$ component refers to the one or more devices that execute some or all of the processing necessary for operation of the present invention, including, but not limited to, operations for loading the declarative definition language, updating the back-end systems, and artificial intelligence or machine learning processing. The form storage device $0b$ component refers to the one or more devices for storing processing instructions, the declarative definition language, and the form data for use with the present invention. The form designer module $0i$ component is for designing a form and/or workflow such that a person designing a form does not need to know any underlying programming language, allowing a person to preview and edit a WYSIWYG version of a form. Finally, the form repository $0h$ is a cloud-based or on-premises repository that stores all of the data and definitions for use by the present system and method.

Figure 1B:
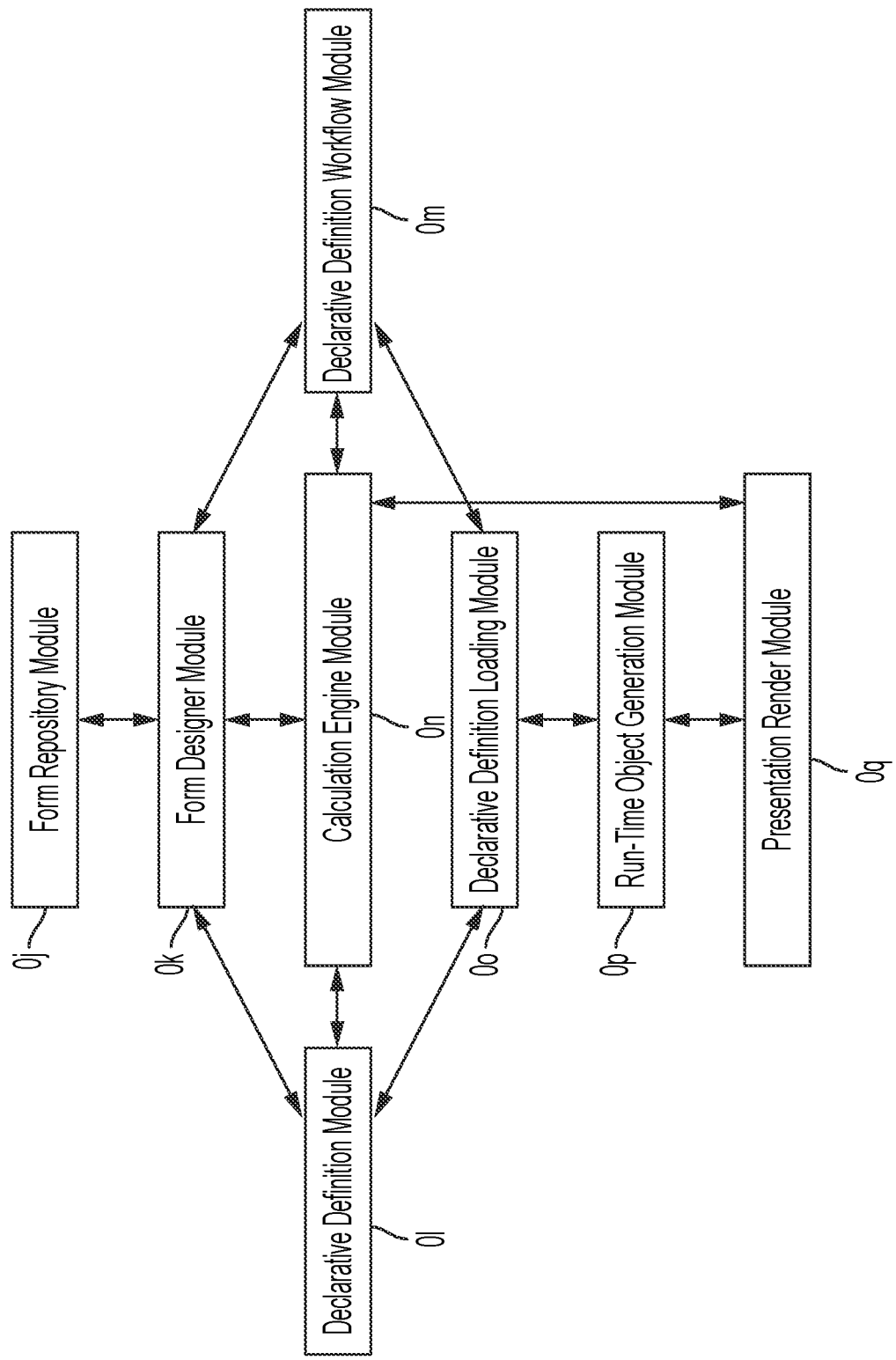
FIG. 1B provides a diagram of the various modules of one embodiment of the present invention.

FIG. 1B provides a diagram of the various modules of one embodiment of the present invention.

Further in accord with an embodiment of the present invention, Form Repository Module $0j$ contains all of the data and definitions for use by the system and method and is a cloud-based or on-premises repository that exposes a REST-ful API to allow access. The Form Repository Module $0j$ is connected to the Form Designer Module $0k$, which uses the REST-ful API to access the Form Repository Module $0j$. All calls to the Form Repository Module $0j$ pass through user authentication and authorization. The Form Repository Module $0j$ also controls which forms are assigned to which users, and therefore, which forms a user will see and are expected to work on. The Form Repository Module $0j$ may assign forms to zero, one, or more individual users, as well as to zero, one, or more user groups. Supervisor users may be given access to forms assigned to the workers that they supervise for viewing or for editing. The Form Repository Module $0j$ also contains definition-related items with the expectation that they will be read frequently but written less often.

A Form Designer Module 0k is connected to the Form Repository Module 0j, the Declarative Definition Module 0l, the Declarative Definition Workflow Module 0m, and the Calculation Engine Module 0n, and uses a REST-ful API in order to access the Form Repository Module 0j. The Form Designer Module 0j is made user-friendly for a person familiar with operations and processes of her business to create forms because a person designing a form does not need to know any underlying programming language. The Form Designer Module 0k provides a form editor, which presents a what-you-see-is-what-you-get view of the form. The user can add and remove fields, and change their attributes. In some embodiments, the Form Designer Module 0k also provides a graphical workflow editor that presents workflows as either a flow chart or a "swim-lane" style process so that the workflows are easy to understand and change. The Form Designer Module 0k may also allow the user to see the form as it would appear on various screen sizes, to enter test data to ensure correct functionality, and to exercise the workflow.

The Declarative Definition Module 0l is connected to the Form Designer Module 0k, the Calculation Engine Module 0n, and the Declarative Definition Loading Module 0o, and defines fields (i.e., data fields) associated with the form and defines how the fields are to be displayed on screens of various computing devices. For example, the Declarative Definition Module 0l includes instructions to display the fields associated with the form on a screen of a mobile device or a screen of a computer. As the form is loaded on a computing device (e.g., a smartphone, tablet, laptop, or desktop), run-time objects are created and populated with instance-specific data. In some embodiments, the form includes calculations and conditional logic, such as automatic population of fields, controlling visibility and appearance of fields, enabling and disabling fields, etc. The Declarative Definition Module 0l defines a data structure for a form based on fields and presentation associated with the form. Such data structure allows data associated with the fields and appearance of the form to the user to be handled separately, thereby enabling the form to be rendered to different screen sizes and capabilities, paper sizes, formats, etc., without requiring rules or code to be written. The Declarative Definition Module 0l is flexible to be used with a variety of data formats, including JSON and XML.

The Declarative Definition Workflow Module 0m is connected to the Form Designer Module 0k, the Calculation Engine Module 0n, and the Declarative Definition Loading Module 0o, and is made user-friendly for a person familiar with operations and processes of her business to create workflows. The person designing the workflow does not need to know any underlying programming language. The Declarative Definition Workflow Module 0m presents workflows as either a flow chart or a "swim-lane" style process so that the workflows are easy to understand and change.

The Calculation Engine Module 0n is connected to the Form Designer Module 0k, the Declarative Definition Module 0l, and the Declarative Definition Workflow Module 0m. In some embodiments, the Calculation Engine Module 0n assists the user when working with calculations and has a learning feature that recognizes common patterns of usage and suggests them. The learning feature uses machine learning to identify common patterns across all of the fields on all of the forms in the system and suggest the appropriate calculations or calculation arguments within the context of the field. The machine learning aspect allows the Calculation Engine Module 0n to evolve over time as more calculations are entered or updated and more forms are added to the system. Thus, the learning feature results in faster and more efficient operation and enhances the form designer's experience.

In some embodiments, the Declaration Definition Loading Module 0o is connected to the Declarative Definition Module 0l and downloads or loads data from the Declarative Definition Module 0l from a server, local or networked storage, local cache, loaded from a local database, loaded from a remote database, or loaded from any other storage system or architecture known in the art. In an exemplary embodiment of the present invention, JSON is used as an underlying text-based representation in the stored language text but it can be appreciated that other formats could be used, such as YAML, XML, binary representation custom/proprietary formats, etc. In some embodiments, the stored language text is initially parsed from JSON (or other) into a basic keys-and-values nested dictionary structure. The keys-and-values nested dictionary structure is then validated against a schema to ensure that a JSON data structure matches an expected structure, and if so, results in validated structures. Once the JSON data structures are validated, the Run-Time Object Generation Module 0p creates run-time objects and methods such that they can then be used directly by other components of the system, such as the Presentation Renderer Module 0p and the Calculation Engine Module 0n.

The Presentation Renderer Module 0q translates the instructions of the Declarative Definition Module 0l, including any calculations from the Calculation Engine Module 0n, into instructions that a user interface tool uses, such as HTML for a web browser. The Presentation Renderer Module 0q makes it so that the form can be displayed in a web browser, a mobile app, a desktop app, a plug-in installed into a third-party application (thus adding the form capability to a third-party system), or to a printed page. It can be appreciated that the printed page can be in any form of physical or digital printing, including printing in Adobe PDF format.

Figure 1C:
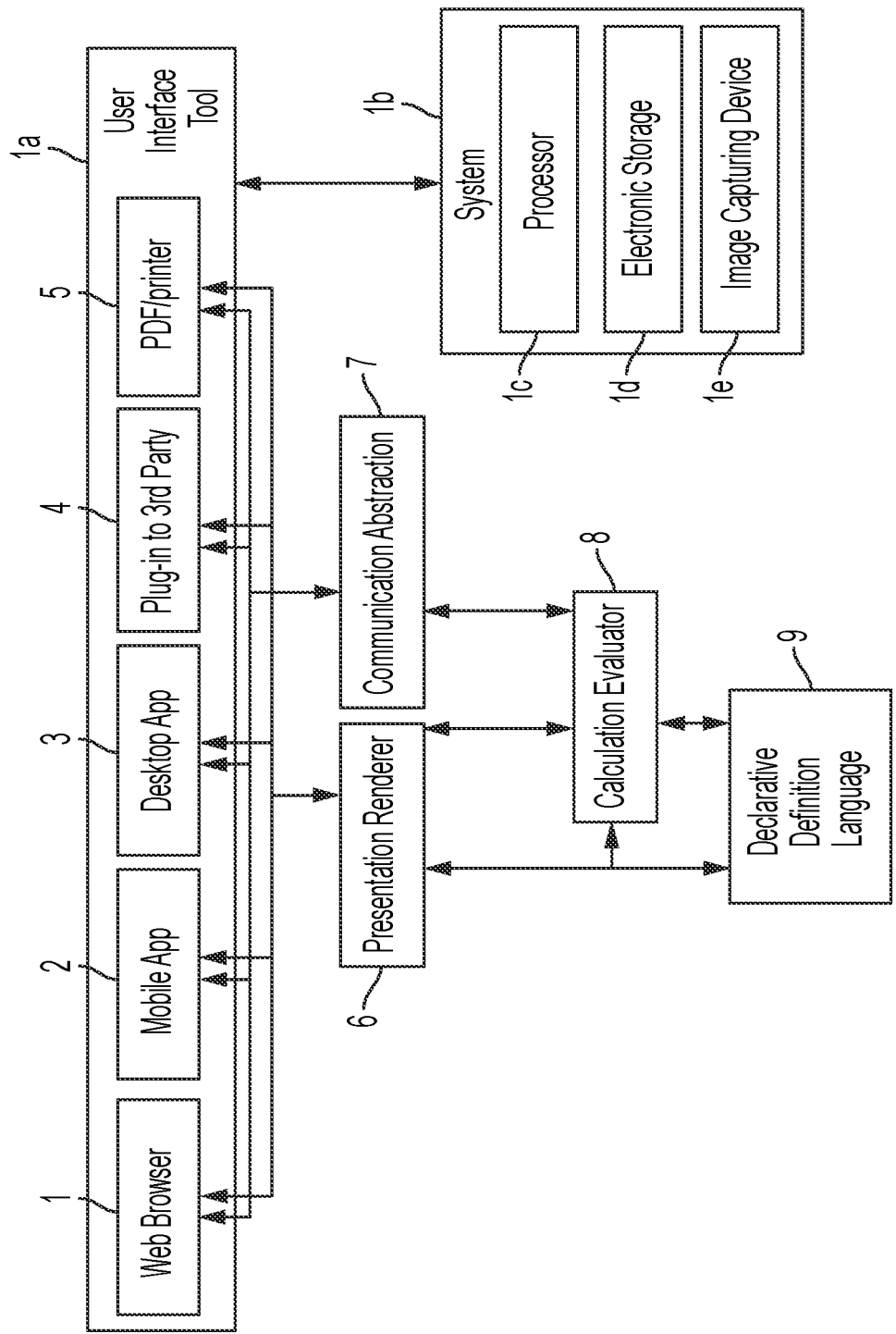
FIG. 1C provides a diagram of a system for using a declarative definition language to drive a presentation renderer to render a form.

FIG. 1C provides a diagram of a system for using a declarative definition language to drive a presentation renderer to render a form.

In a first embodiment of the present invention, a form is defined based on a declarative definition language 9. The declarative definition language 9 defines fields (i.e., data fields) associated with the form and defines how the fields are to be displayed on screens of various computing devices. For example, the declarative definition language 9 includes instructions to display the fields associated with the form on a screen of a mobile device or a screen of a computer. As the form is loaded on a computing device, run-time objects are created and populated with instance-specific data. In some embodiments, the form includes calculations 8 and conditional logic, such as automatic population of fields, controlling visibility and appearance of fields, enabling and disabling fields, etc.

According to the embodiment, a presentation renderer 6 translates the instructions of the declarative definition language 9, including any calculations 8, into instructions that a user interface tool 1a uses, such as HTML for a web browser 1. The form can be displayed in a web browser 1, a mobile app 2, a desktop app 3, a plug-in installed into a third-party application 4 (thus adding the form capability to a third-party system), or to a printed page 5. It can be appreciated that the printed page 5 can be in any form of physical or digital printing, including printing in Adobe PDF format.

It should be appreciated that any communication medium 7 may be used to facilitate interactions between different components of the system 1b of FIG. 1C, including a processor 1c, electronic storage 1d, and image capturing device 1e connected to the user interface tool 1a. One or more components of the system 1b may communicate with each other through hard-wired communication, wireless communication, or both. For example, the one or more components of the system may communicate with each other through a network. For example, the processor 1c may wirelessly communicate with the electronic storage 1d. By way of non-limiting example, wireless communication may include one or more of radio communication, Bluetooth communication, Wi-Fi communication, cellular communication, infrared communication, or other wireless communication. Other types of communications are contemplated by the present disclosure and not excluded.

In some implementations, the processor 1c comprises a plurality of processing units. These processing units may be physically located within the same device, or may be a plurality of devices operating in coordination. The processor 1c may be configured to execute one or more components by software; hardware; firmware; some combination of software, hardware, and/or firmware; and/or other mechanisms for configuring processing capabilities.

Furthermore, it should be appreciated that although the various instructions are illustrated in FIG. 1C as being co-located within a single processing unit, it could also be implemented to include multiple processing units with one or more instructions which may be executed remotely from the other instructions.

The description of the functionality provided by the different computer-readable instructions described herein is for illustrative purposes, and is not intended to be limiting, as any of instructions may provide more or less functionality than is described. For example, one or more of the instructions may be eliminated, and some or all of its functionality may be provided by other ones of the instructions. As another example, the processor(s) 1c may be programmed by one or more additional instructions that may perform some or all of the functionality attributed herein to one of the computer-readable instructions.

Figure 2:
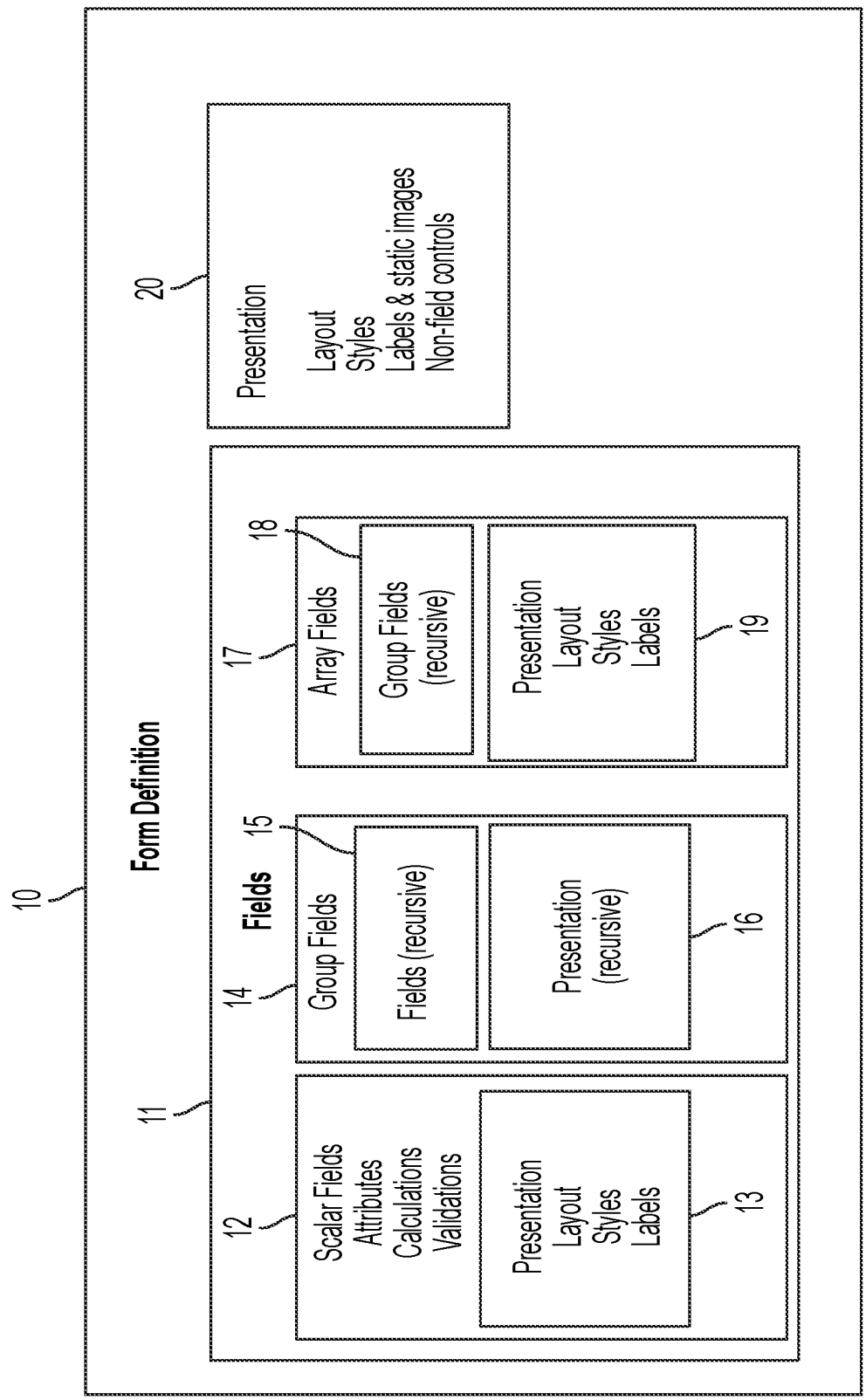
FIG. 2 provides a diagram of the declarative definition language to support defining a form according to an embodiment of the present invention.

Referring to FIG. 2, there is shown a diagram of the declarative definition language to support defining a form according to an embodiment of the present invention.

The declarative definition language 9 defines a data structure for a form based on fields 11 and presentation 20 associated with the form. Such data structure allows data associated with the fields 11 and appearance of the form to the user to be handled separately, thereby enabling the form to be rendered to different screen sizes & capabilities, paper sizes, formats, etc., without requiring rules or code to be written.

In other embodiments, the fields 11 include scalar fields 12 (such as text, numbers, images, etc.), group fields 14, and/or array fields 18. The form is scalable, allowing new field types to be added as needed. The declarative definition language 9 is flexible to be used with a variety of data formats, including JSON and XML.

The scalar fields 12 refer to field types that contain one piece of information, such as text, a number, or date. These types will have a typical way of being presented to a user, but may also be presented in another manner depending on the needs of the form. For example, numbers may be presented with or without thousands separators (commas), long text may be truncated with an ellipsis to permit the user to press to see more of the long text, and dates can be shown in any number of formats.

The group fields 14 allow for a set of fields 11 (themselves scalar, array, or groups) to be treated together logically. For example, an address could be a group made up of text fields for the street address, city, state, and zip code. One enable calculation on the address group can control all of the fields within it. Furthermore, the group may be presented with shared attributes such as background color (in the example, this could be used to differentiate the shipping and billing addresses), to embed the group within a section that the user can open or close, possibly to save screen area, to group data into tabs that the use can switch between, or other ways of presenting the data.

The array fields 18 allow for repeating groups, such as line items on an invoice. The presentation for an array may include options such as layout for each item, horizontal vs vertical arrangements, or displaying data from the array in graphs or charts. The data in the array might also be filtered for presentation.

In some embodiments, the scalar fields 12 specifies attributes associated with data, initial values, calculations to be performed for a field (such as allowing a value for a field to be updated when a value for another field is changed), and validations that can be enforced (such as minimum values). The scalar fields 12 also contains presentation information 13 relating to a layout, styles, and/or labels for the scalar fields 12.

In some embodiments, the group fields 14 allow for indefinite nesting of data, and allow for additional presentation information 16 to be added. The group fields 14 repeats the data structure of the form as a whole, and its presentation block allows for the same flexibility as it does for the form.

In some embodiments, the array fields 18 is homogeneous or heterogeneous, and contains presentation information 19 for an array as a whole as well as for the group fields 14 contained within the array.

Figure 3:
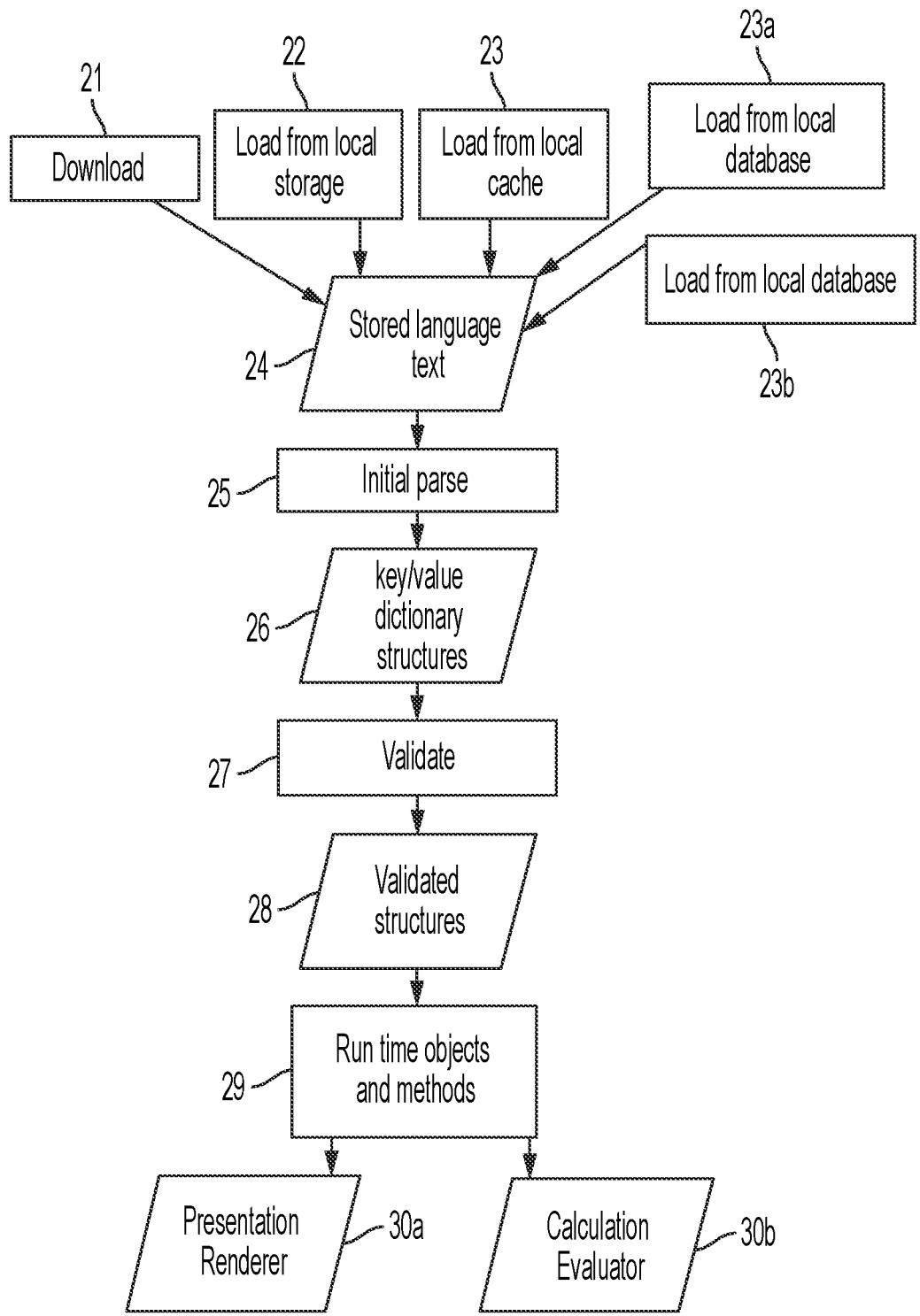
FIG. 3 provides a diagram of the loading process for the declarative definition language according to an embodiment of the present invention.

Referring to FIG. 3, there is shown a diagram of the loading process for the declarative definition language according to an embodiment of the present invention.

The declarative definition language 9 is downloaded 21 from a server, loaded from a local or networked storage 22, loaded from a local cache 23, loaded from a local database 23a, loaded from a remote database 23b, or loaded from any other storage system or architecture known in the art. In an exemplary embodiment of the present invention, JSON is used as an underlying text-based representation in the stored language text 24, but it can be appreciated that other formats could be used, such as YAML, XML, binary representation custom/proprietary formats, etc.

The stored language text 24 is initially parsed 25 from JSON (or other) into a basic keys-and-values nested dictionary structure 26. The keys-and-values nested dictionary structure 26 is then validated 27 against a schema to ensure that a JSON data structure matches an expected structure, and if so, results in validated structures 28. Once the JSON data structures are validated, run-time objects and methods 29 are created such that they can then be used directly by other components of the system, such as the presentation renderer 30a and the calculation evaluator 30b.

The operations of the loading process presented herein are intended to be illustrative and, as such, should not be viewed as limiting. In some implementations, the loading process is accomplished with one or more additional operations not described, and/or without one or more of the operations discussed. In some implementations, two or more of the operations occur substantially simultaneously. The described operations may be accomplished using some or all of the system components described in detail above.

In some implementations, the loading process is implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices include one or more devices executing some or all of the operations of the loading process in response to instructions stored electronically on one or more electronic storage mediums. The one or more processing devices may include one or more devices configured through hardware, firmware, and/or software to be specifically designed for execution of one or more of the operations of the loading process.

Figure 4:
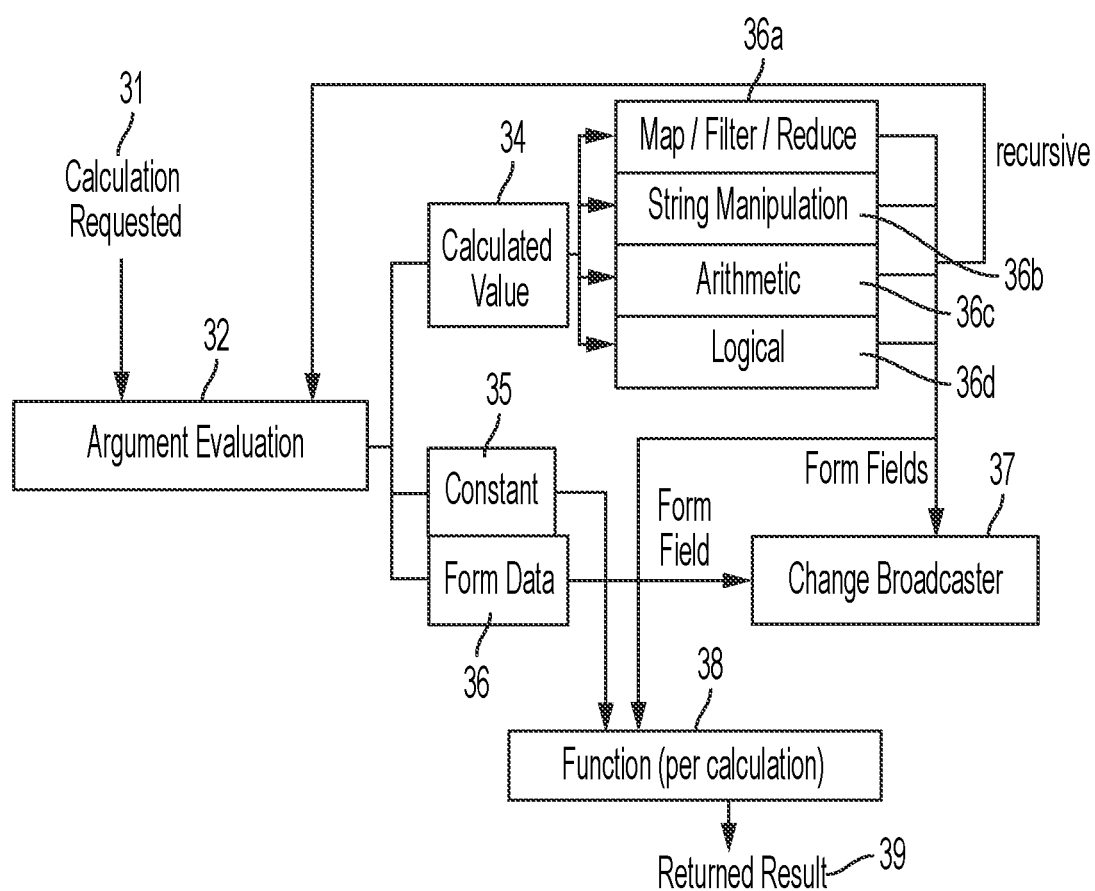
FIG. 4 provides a diagram of the calculation engine according to an embodiment of the present invention.

As seen in FIG. 4, a diagram of the calculation engine according to an embodiment of the present invention.

Even though the declarative definition language 9 is used, other embodiments of the present invention provide for a calculation 31 to be written. In such a case, a calculation evaluator's run-time evaluates an argument 32 against form data 36 and returns a result 39. The calculation 31 includes constants 35, retrieval of form data values 36, and calculations using map/filter/reduce 36a for transformation of large data sets, string manipulation 36b, arithmetic 36c, and logical operations 36d. The calculation 31 is designed with the data form in mind and are under the same control as the rest of the system, allowing new functionality to be added easily.

In some embodiments, when evaluating the calculation 31, first arguments 32 must be evaluated. Types and meanings of the first arguments 32 are dependent on specifics of the calculation 31. In most cases, the first arguments 32 can themselves be additional calculations for the calculation 31. When the calculation 31 references the form data 36, a reference associated with the form data is collected and registered with a change broadcaster 37 along with information about an intent of the calculation 31. For example, if a user is allowed to enter a date range, then the user can enter a start date and be allowed to edit an end date or a number of days, with a change to the end date changing the number of days and vice versa. Such functionality allows users to conveniently and efficiently edit form fields.

In some embodiments, the change broadcaster 37 monitors the form data 36, so that when a value of a field is changed (via user input, calculation, or anything else), a caller associated with the calculation 31 that is affected will be notified that the value of the field may have changed.

Figure 5:
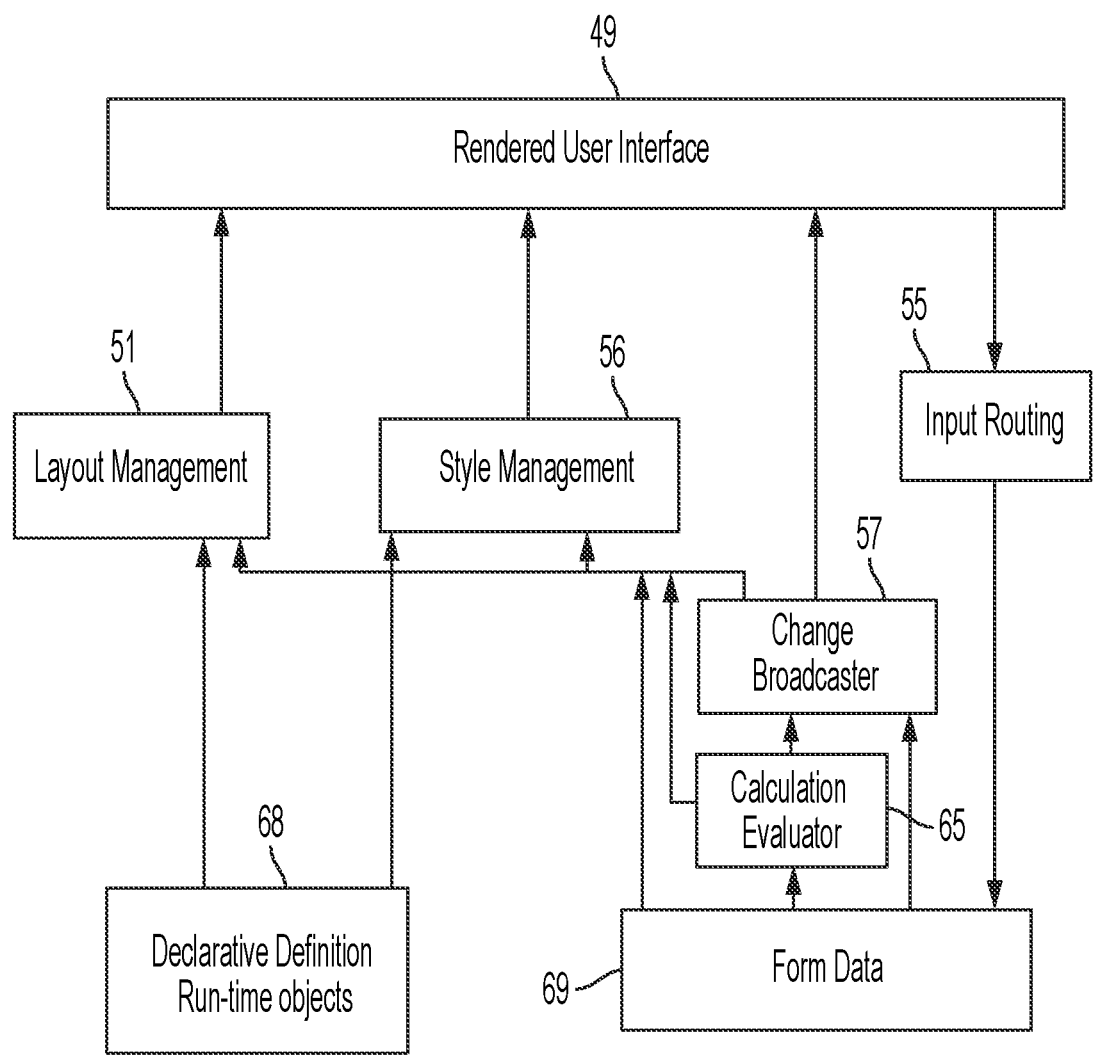
FIG. 5 provides a diagram of the presentation renderer according to an embodiment of the present invention.

FIG. 5 shows a diagram of the presentation renderer according to an embodiment of the present invention.

The presentation renderer 6 combines the presentation information 20 provided by the declarative definition language 9 and the form data 69 to create the layout and styling instructions for the rendered user interface 49. According to one aspect of the invention, the declarative definitions include declarative definition run-time objects 68.

A layout management 51 processes the information to provide a placement and sizing of controls, including dynamic features such as tabs and collapsible areas, while the style management 56 concerns itself with an appearance of a form, such as fonts, colors, column and row sections, field height and width, margins, etc. The layout management 51 can also include an ability to show and hide controls dynamically, such as when a billing address is the same as a shipping address. It can also be appreciated that there are many other real-world scenarios where such dynamic hiding and showing can be accomplished.

In some embodiments, the form data 69 is directly entered by a user through the rendered user interface 49 or is retrieved by other means, such as through a camera, microphone, Bluetooth thermometer, etc. This form data 69 is then routed back to the form through an input routing 55.

In some embodiments, changes in the form recorded by the change broadcaster 57, either directly or indirectly because of calculation evaluations in an calculation evaluator 65, is broadcasted back to the layout management 51, a style management 56, and/or the rendered user interface 49 as needed so that the user always sees the current data. This also allows a single data field to be rendered in more than one fashion while automatically staying synchronized. For example, according to one aspect of the present invention, a "rating" field could be shown and changed as a numeric value, a slider, a set rating of stars, or any combination of these and other field types known in the art. The presentations of the field will show the same value, always, regardless of how the field is rendered.

The rendered user interface 49 is most commonly rendered into HTML for display in a browser or an embedded control that works with HTML, but it can be appreciated that it could be rendered in many different ways. In one embodiment, the rendered user interface 49 is rendered into Postscript for printing or saving in a PDF document. In another embodiment, the rendered user interface 49 is rendered into a series of commands for a native user interface, such as Cocoa Touch for iOS or WPF for Windows.

Figure 6:
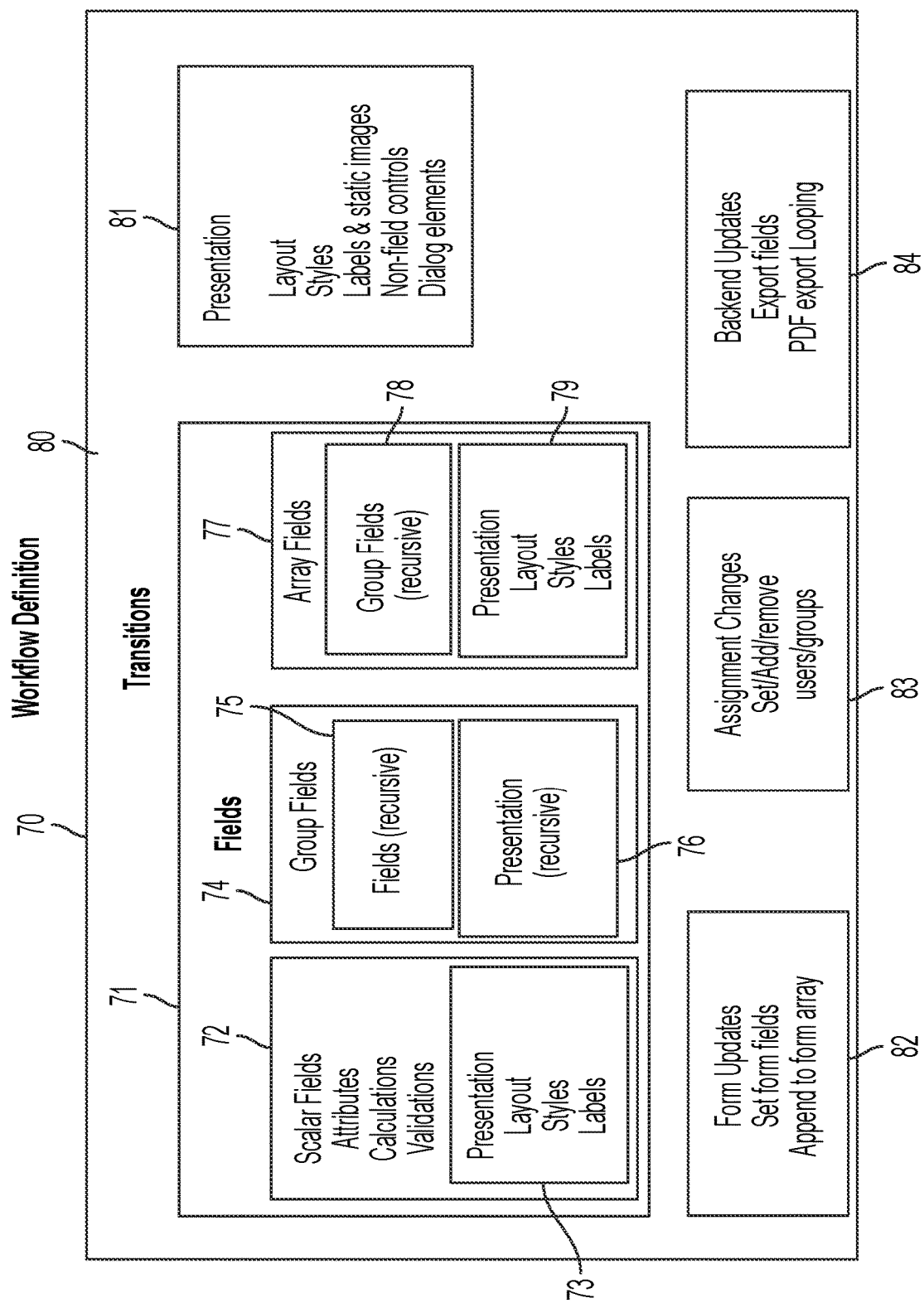
FIG. 6 provides a diagram of the declarative definition language to support defining a workflow according to an embodiment of the present invention.

As shown in FIG. 6, there is a diagram of the declarative definition language to support defining a workflow according to an embodiment of the present invention.

The declarative definition language defines a workflow 70 as a collection of transitions 80. Each transition can comprise fields 71 and presentations 81, form updates 82, assignment changes 83, and backend updates 84.

In some embodiments, the fields 71 of the transitions 80 define the same way as a field in a form. Often, the fields 71 of the transitions 80 are initialized by copying values from fields of the form.

The presentations 81 associated with the transitions 80 are optional, and are defined the same way as a presentation associated with the form, with additions of dialog elements, prompts for the user, and text for "OK" and "Cancel" buttons. A transition without presentation does not need user interaction to complete.

In some embodiments, the form updates 82 map the fields 71 of the transitions 80 to the fields of the form, either copying values from the transitions 80 to the form, or appending a new group onto an array associated with the form. This allows the transitions 80 to modify values that the user is normally not permitted to change, which can be used to enforce data consistency.

In some embodiments, the assignment changes 83 either set the form's assignment to a collection of users or groups, or selectively adds and remove users and groups from the existing assignment. A calculation 31 may be used in this process.

In some embodiments, the transitions 80 trigger the backend updates 84 to the backend systems. The transition definition includes multiple updates. Each update specifies fields to be exported to the back end systems, exporting the form as a PDF or other rendering, and making multiple calls based on content array fields. In one aspect of the invention, these fields are filtered.

Figure 7:
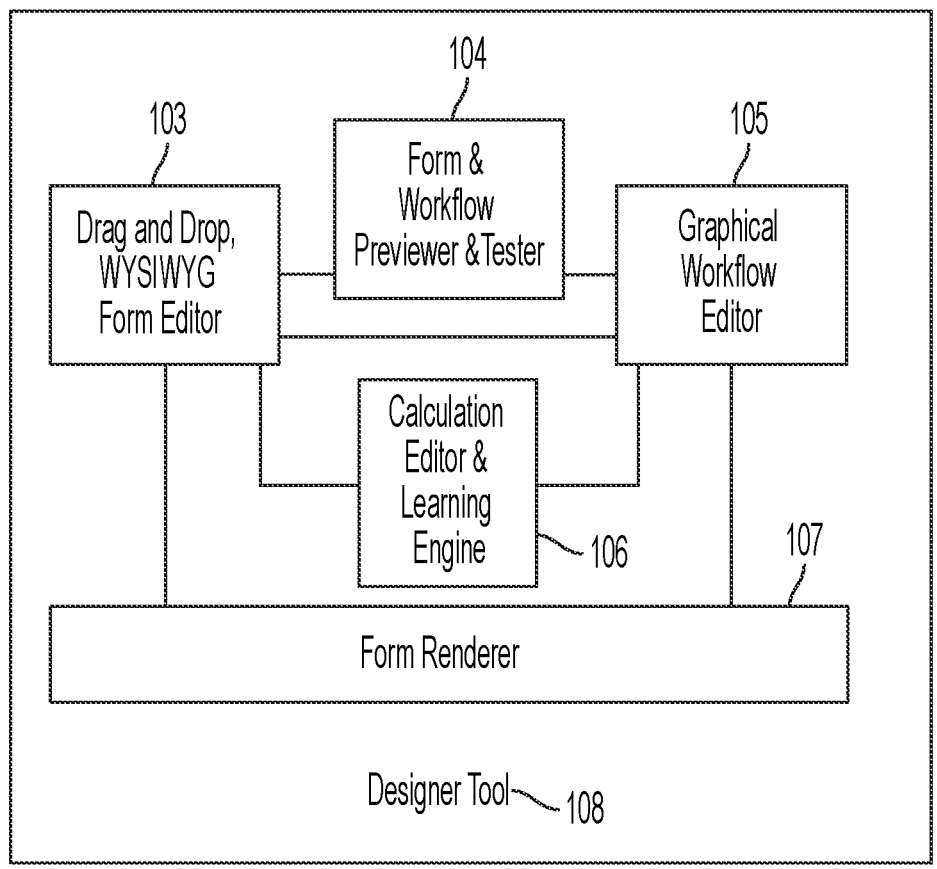
FIG. 7 provides a diagram of a designer tool for designing a workflow according to an embodiment of the present invention.

Referring to FIG. 7, there is shown a diagram of a designer tool 108 for designing a workflow according to an embodiment of the present invention.

The designer tool 108 is made to be easy for a person familiar with operations and processes of her business to create forms. The person designing a form does not need to know any underlying programming language.

In some embodiments, the designer tool provides a form editor 103. The form editor 103 presents a what-you-see-is-what-you-get view of the form. The user can add and remove fields, and change their attributes.

In some embodiments, the designer tool 108 provides a graphical workflow editor 105. The graphical workflow editor 105 presents workflows as either a flow chart or a "swim-lane" style process so that the workflows are easy to understand and change.

In some embodiments, the designer tool provides a previewer/tester 104. The previewer/tester 104 allows the user to see the form as it will appear on various screen sizes, to enter test data to ensure correct functionality, and to exercise the workflow.

In some embodiments, the designer tool provides a specialized calculation editor 106. The specialized calculation editor 106 assists the user when working with calculations. The specialized calculation editor 106 has a learning feature that recognizes common patterns of usage and suggests them. The learning feature uses machine learning to identify common patterns across all of the fields on all of the forms in the system and suggest the appropriate calculations or calculation arguments within the context of the field. The machine learning aspect allows it to evolve over time as more calculations are entered or updated and more forms are added to the system. Thus, the learning feature results in faster and more efficient operation of the specialized calculation editor 106 and enhances the form designer's experience.

Figure 8:
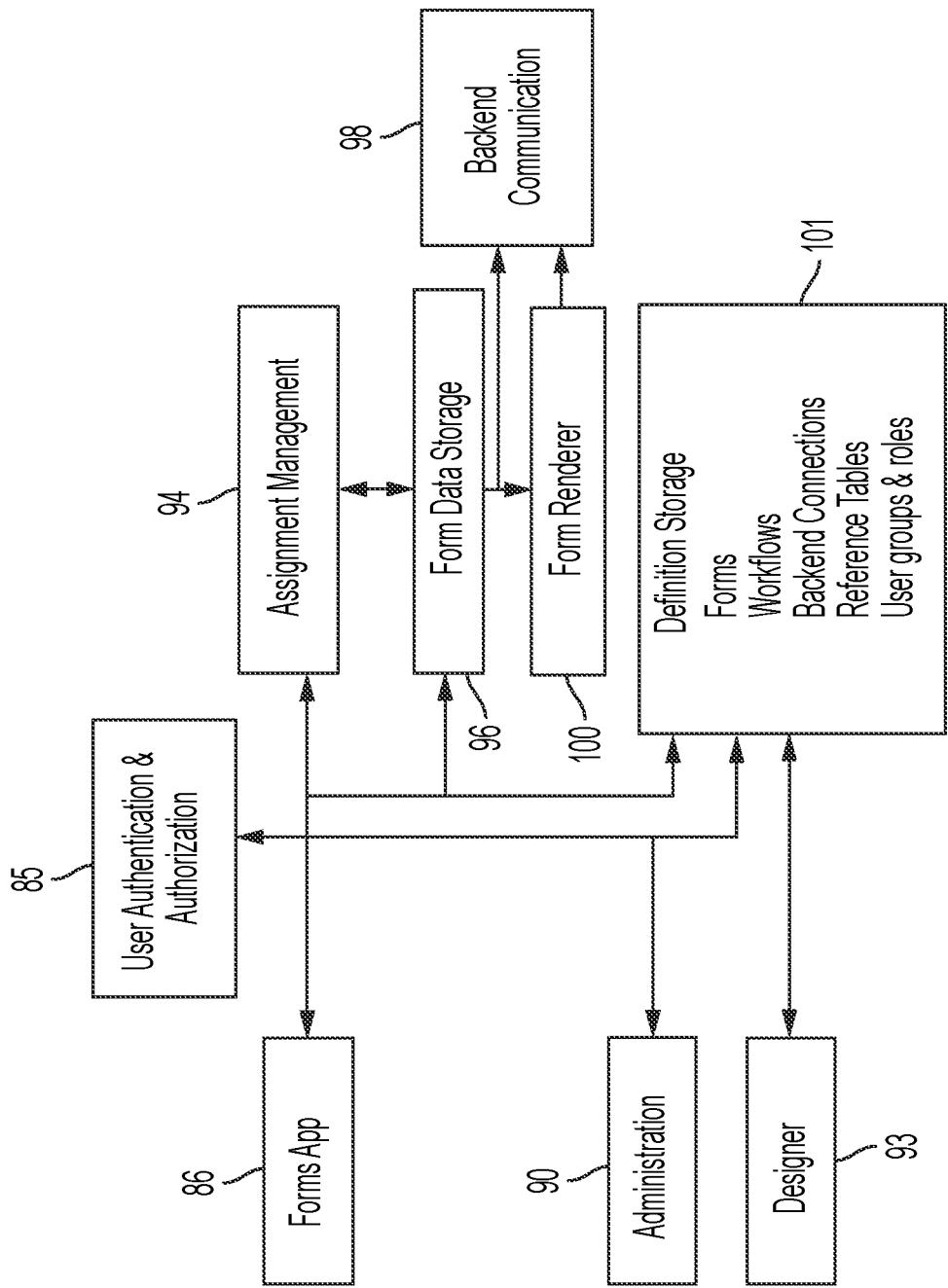
FIG. 8 provides a diagram of a forms repository according to an embodiment of the present invention.

In FIG. 8, there is a diagram of a forms repository according to an embodiment of the present invention.

All of the data and definitions for use by the system are stored in a cloud-based or on-premises repository, which exposes a REST-ful API to allow access. The forms app 86 (including browser-based, mobile, desktop, or embedded third-party applications), administrative tools 90, and the forms designer tool 93 all use this API to access the repository. All calls must pass through user authentication and authorization processing 85.

The Assignment Management 94 controls which forms are assigned to which users, and therefore, which forms a user will see and are expected to work on. Forms may be assigned to zero, one, or more individual users, as well as to zero, one, or more user groups. Supervisor users may be given access to forms assigned to the workers that they supervise for viewing or for editing.

Definitions and definition-related items are stored together in a definition storage 101, with the expectation that they will be read frequently but written less often.

In some embodiments, the forms apps 86 reads and updates form data in the form data storage 96. Updates to the form data storage 96 can trigger calls to other backend systems through backend communications 98, such as through email or messaging systems, database systems, or other business systems. The forms renderer 100 runs entirely in the cloud, allowing the forms to be updated and even re-rendered.

Figure 9:
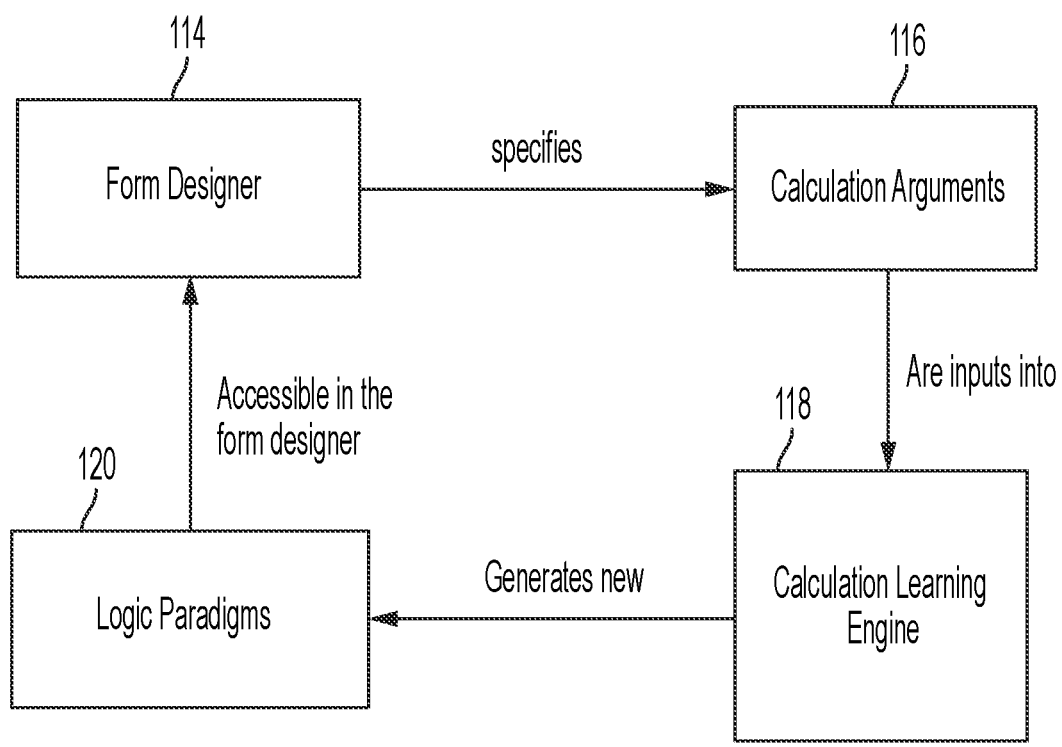
FIG. 9 provides a diagram of a calculations learning engine according to an embodiment of the present invention.

In FIG. 9, there is shown a diagram of a calculations learning engine according to an embodiment of the present invention.

The calculation learning engine 118 ingests calculation arguments 116 that have been defined on the forms by the form designer 114, examines them for patterns and potential extensions, and then generates logic paradigms 120 that can be used when creating calculation arguments in the form designer 114 on other forms and fields. The calculation learning engine 118 is constantly updating and releasing new logic paradigms 120 based on all of the form designers 114 using the form solution. Calculations 31 and calculation arguments 116, like many programming paradigms, are pattern-based. These patterns, while not obvious, are based on characteristics that include (but are not limited to) data type, relative position to other fields, relationship to other fields, field naming patterns, fields on other forms, forms within a given industry, etc. By continuously analyzing these characteristics using machine learning, the Calculation Learning Engine 118 improves over time and is able to suggest calculations and calculation arguments and can complete calculation and calculation arguments as a form designer begins to enter a calculation. The results are similar to the results of word processing tools that analyze grammar and context to offer options to finish sentences as you type. Thus, the Calculation Learning Engine 118 results in faster and more efficient operation and enhances the form designer's experience.

FIG. 10A shows a first page of an exemplary paper form that can be designed and generated into a digital format according to an embodiment of the present invention.

Figure 10B:
FIG. 10B shows a second page of an exemplary paper form that can be designed and generated into a digital format according to an embodiment of the present invention.

FIG. 10B shows a second page of an exemplary paper form that can be designed and generated into a digital format according to an embodiment of the present invention.

FIGS. 10A and 10B illustrate a typical paper form of the kind to be digitized and replaced by an exemplary embodiment of the present invention. As is routine in field force industries like infrastructure inspection, the paper form includes many different fields and many different types of fields for editing and input by the user (in this case, a water leak inspector). By way of example, the water leak report shown in FIGS. 10A and 10B includes different fields for the address of the leak, dates of inspection, checkboxes for leak characteristics, an area for additional user input and comment, and an area for sketching and drawing the leak, among others.

After editing by the user, paper forms in field force industries such as those shown in FIGS. 10A and 10B are manually delivered or routed through various stakeholders. This routing could take anywhere from several hours to several days or even weeks due to the necessity of manual processing. Moreover, changes to such forms cannot be deployed instantaneously across all users, resulting in the handling of outdated forms and further contributing to inefficacies in processing. Additionally, analysis or processing of the underlying data across a plurality of different paper forms can be burdensome, requiring one to retrieve and review every relevant form to collect the necessary data.

FIG. 11A shows a first example of a digital form generated according to an embodiment of the present invention from the paper form in FIGS. 10A and 10B.

FIG. 11B shows a second example of a digital form generated according to an embodiment of the present invention from the paper form in FIGS. 10A and 10B.

FIG. 11C provides a third example of a digital form generated by the system according to an embodiment of the present invention from the paper form in FIGS. 10A and 10B.

Figure 11D:
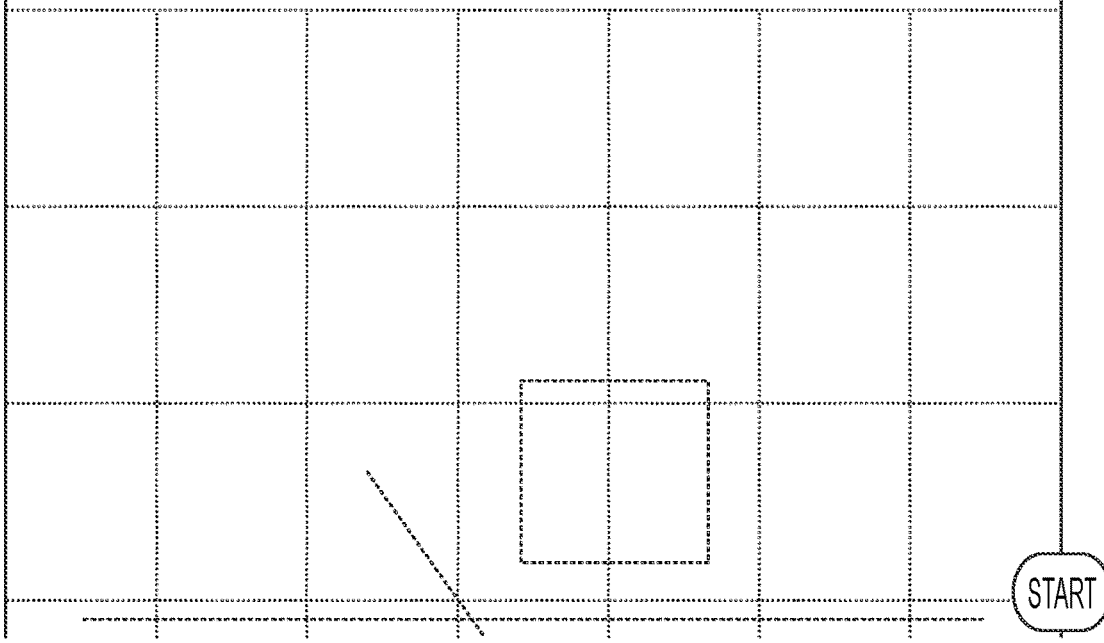
FIG. 11D provides a fourth example of a digital form generated by the system according to an embodiment of the present invention from the paper form in FIGS. 10A and 10B.

FIG. 11D provides a fourth example of a digital form generated by the system according to an embodiment of the present invention from the paper form in FIGS. 10A and 10B.

FIG. 11E shows a fifth example of a digital form generated according to an embodiment of the present invention from the paper form in FIGS. 10A and 10B.

FIGS. 11A, 11B, 11C, 11D, and 11E illustrate different examples of digital forms generated from the paper form of FIGS. 10A and 10B using the system and process disclosed herein. It can be appreciated that the digital forms generated in FIGS. 11A-11E can be consistently displayed across a variety of different user interfaces, including web, mobile, and desktop applications. It can be further appreciated that the many different fields and the many different types of fields that would be addressed manually using the paper form of FIGS. 10A and 10B can be designed and generated using the system and method of the present invention, including the address of the leak, dates of inspection, checkboxes for leak characteristics, an area for additional user input and comment, and an area for sketching and drawing the leak, among others. Business users or form designers are able to easily generate such digital forms from the corresponding paper forms and do not need to be skilled at writing code. The use of such digital forms allows for rapid and efficient processing by the various stakeholders involved, and also allows for sophisticated analysis of the underlying data. For example, one could easily search for every water leak inspection report that occurred on a certain day or by size and material of the water main. Moreover, any updates to the form itself are instantly deployed to all users without the need for manual updating.

According to one embodiment of the present invention, a user begins designing a form by using an application, software, or other program installed on a computing device or server to operate a form designer tool. This user does not need to know any underlying programming language in order to operate this tool. The form designer tool features a form editor that presents the user with a WYSIWYG view of the form, allowing the user to easily add or remove fields, change their attributes, position, and orientation, as well as allowed input arguments. Machine learning processing will also suggest to the user appropriate calculations or calculation arguments as more calculations are entered or updated and more forms are added to the system. This processing allows these forms to be designed more efficiently and quickly. For example, a supervisor in a city's water department may wish to design a form for water leak inspections that would include the address of the leak, the date of inspection, checkboxes for leak characteristics, an area for additional user input and comment, and an area for sketching and drawing the leak. If there were other forms already in the system, the machine learning processing could suggest to the supervisor additional date or checkbox fields, for example, as the supervisor edits and designs the form. The user is also able to operate a graphical workflow editor that automates the form designing, management, and/or processes so that forms can be more quickly and efficiently designed and reviewed.

After a form is designed, either the form designer or additional users may input and edit data into that form as determined by the design of the form. For example, a water leak inspector may edit a field to input the address of a leak. It can be appreciated that this inspector would be able to input and edit these forms on any manner of mobile or stationary computing devices and that the forms would automatically adjust and scale for proper display on those devices. Thus, the inspector could edit the form in a convenient manner on the job site, at home, work, or any combination of various locations and at different times as necessary. At the conclusion of editing, the completed form would then be automatically routed to various stakeholders that would need to review the details of the inspection. For example, the form could be automatically routed to contractors to provide an estimate for repairs. After the completed form is stored, it would also allow a supervisor in a local water department to search all such reports on a specific street or city block to assess the need for more major repairs or replacement of water lines.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible computer readable storage medium may include read only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

For purposes of explanation, numerous specific details are set forth in order to provide a thorough understanding of the description. It will be apparent, however, to one skilled in the art that implementations of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one implementation", "an implementation", "some implementations", "various implementations", "certain implementations", "other implementations", "one series of implementations", or the like means that a particular feature, design, structure, or characteristic described in connection with the implementation is included in at least one implementation of the disclosure. The appearances of, for example, the phrase "in one implementation" or "in an implementation" in various places in the specification are not necessarily all referring to the same implementation, nor are separate or alternative implementations mutually exclusive of other implementations. Moreover, whether or not there is express reference to an "implementation" or the like, various features are described, which may be variously combined and included in some implementations, but also variously omitted in other implementations. Similarly, various features are described that may be preferences or requirements for some implementations, but not other implementations.

The language used herein has been principally selected for readability and instructional purposes, and it may not have been selected to delineate or circumscribe the inventive subject matter. Other implementations, uses and advantages of the invention will be apparent to those skilled in the art from consideration of the specification and practice of the invention disclosed herein. The specification should be considered exemplary only, and the scope of the invention is accordingly intended to be limited only by the claims.

The invention claimed is:

1. A method for using a declarative definition language to drive a presentation renderer to render a form, comprising:
defining a form using a declarative definition language, wherein the declarative definition language defines the form in terms of its fields and its presentation;
generating a run-time object from the declarative definition language;
entering the form data;
evaluating a calculation against the form data and returning a result, wherein the step of evaluating comprises the steps of:
collecting a reference associated with the form data;
registering the reference with information associated with an intent of the calculation;
rendering the form with a presentation renderer, wherein the presentation renderer uses the run-time object and the form data.

2. The method of claim 1, wherein the fields are scalar fields.

3. The method of claim 1, wherein the fields are group fields.

4. The method of claim 1, wherein the fields are array fields.

5. The method of claim 1, further comprising loading the declarative definition language.

6. The method of claim 1, further comprising monitoring the form data with a change broadcaster.

7. The method of claim 1, further comprising managing the layout of form controls.

8. The method of claim 1, further comprising managing the appearance of a form.

9. The method of claim 1, further comprising generating logic paradigms with a calculation learning engine.

10. The method of claim 1, further comprising defining a workflow using the declarative definition language.

11. The method of claim 1, wherein the calculation is evaluated according to a user-defined formula.

12. A system for using a declarative definition language to drive a presentation renderer to render a form, comprising:
a processor for executing instructions to define a form using a declarative definition language, wherein the declarative definition language defines the form in terms of a field and a presentation, and wherein the processor generates a run-time object from the declarative definition language;
a user interface tool for entering a form data, wherein the processor executes instructions for evaluating a calculation against the form data and returning a result, wherein the instructions for evaluating comprises:
instructions for collecting a reference associated with the form data;
instructions for registering the reference with information associated with an intent of the calculation;
a presentation renderer for rendering the form, and wherein the presentation renderer uses the run-time object and the form data.

13. The system of claim 12, wherein the field is a scalar field.

14. The system of claim 12, wherein the field is a group field.

15. The system of claim 12, wherein the field is an array field.

16. The system of claim 12, wherein the processor executes instructions for loading the declarative definition language.

17. The system of claim 12, further comprising a change broadcaster means for monitoring the form data.

18. The system of claim 12, further comprising a layout management tool.

19. The system of claim 12, further comprising a style management tool.

20. The system of claim 12, further comprising a calculation learning engine.

21. The system of claim 12, further comprising a workflow definition means for defining a workflow using the declarative definition language.

22. The system of claim 12, wherein the calculation is evaluated according to a user-defined formula.

23. A system for dynamically defining and generating forms and workflows comprising:
a first input means for receiving instructions from a user to dynamically define a form;
a form defining means, coupled to said first input means to receive said instructions, for defining said form using a declarative definition language based on said instructions, wherein said declarative definition language defines a field and a presentation of said form;
a generator, coupled to said form defining means, for generating a run-time object from said declarative definition language;
a storage device for storing said form;
a portable device for retrieving said form from said storage device over a network;
a second input means, coupled to said portable device, permitting a first user to enter data into said form;
a calculation means, responsive to said data entered into said form, for performing predefined calculations, evaluating said form data, and returning a result, wherein the evaluating comprises:
collecting a reference associated with the form data;
registering the reference with information associated with an intent of the calculation means; and
a presentation renderer for rendering said form, wherein said presentation renderer presents said form on the portable device and uses the run-time object and the form data.

24. The system of claim 23, further comprising a workflow definition means for defining a workflow based on instructions from said first input means.

25. The system of claim 22, wherein the predefined calculations are evaluated according to user-defined formulas.

* * * * *